(No Model.)
A. G. FORBES & G. W. KEMP.
TRIMMING ATTACHMENT FOR SEWING MACHINES.
No. 485,538. Patented Nov. 1, 1892.
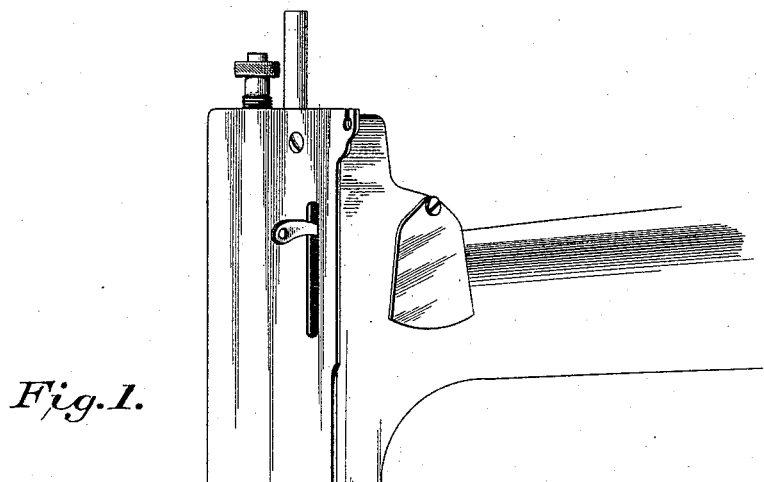
*Fig.1.*
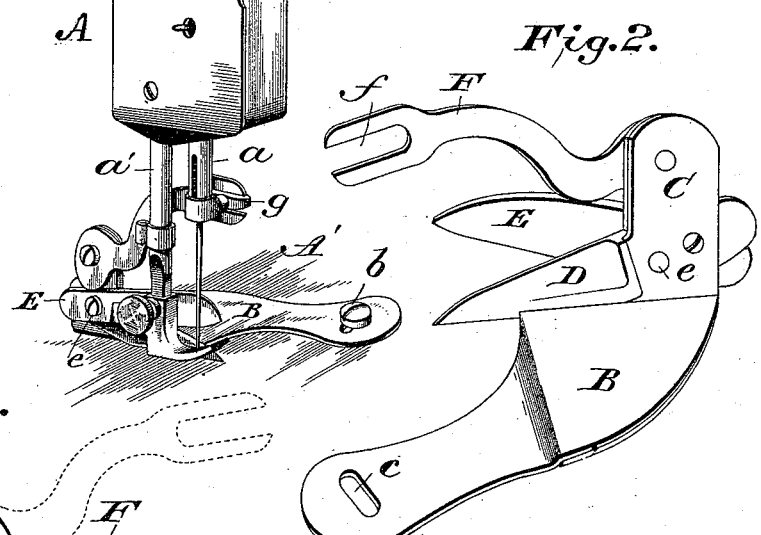
*Fig.2.*
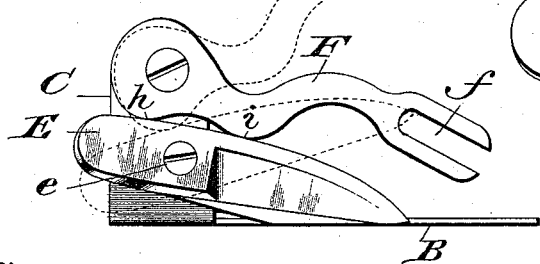
*Fig.3.*
Witnesses
Alexander G. Forbes.
— and —
George W. Kemp.
Inventors
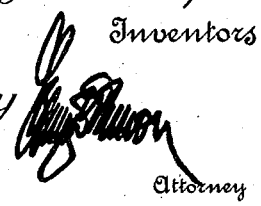
by
Attorney

UNITED STATES PATENT OFFICE.

ALEXANDER G. FORBES AND GEORGE W. KEMP, OF MONTGOMERY, ALABAMA.

TRIMMING ATTACHMENT FOR SEWING-MACHINES.

SPECIFICATION forming part of Letters Patent No. 485,538, dated November 1, 1892.

Application filed February 18, 1892. Serial No. 422,024. (No model.)

*To all whom it may concern:*

Be it known that we, ALEXANDER G. FORBES and GEORGE W. KEMP, citizens of the United States of America, residing at Montgomery, in the county of Montgomery and State of Alabama, have invented certain new and useful Improvements in Cutting Attachments for Sewing-Machines; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in trimming or cutting attachments for sewing-machines in which shears are connected or attached to the bed-plate, so as to be operated from the reciprocating needle-bar to cut or trim fabrics when the sewing-machine is used for stitching, said device being also adapted to be utilized in cutting or trimming fabrics independent of the sewing mechanism; and the invention consists in a cutting or trimming device having a stationary blade which is adapted to be rigidly attached to a plate which can be secured to the bed-plate of the sewing-machine, said blade having pivotally secured thereto a blade which is operated by a pivoted lever having two cams or projections which engage with and oscillate the movable blade when the said lever is placed in engagement with the needle-bar of the machine, as will be hereinafter fully set forth, and particularly pointed out in the claims.

In the accompanying drawings, forming part of this specification, Figure 1 is a perspective view showing our cutting or trimming attachment applied to a sewing-machine. Fig. 2 is a perspective view of the complete attachment detached from the machine. Fig. 3 is a side elevation showing the movable blade depressed in full lines and elevated in dotted lines.

A designates a portion of a sewing-machine, $a$ being the reciprocating needle-carrying bar and $a'$ the bar to which the presser-foot is attached.

A' designates the bed-plate, which has a suitable aperture threaded for the reception of a screw $b$ for securing our attachment to said bed-plate.

B designates the angle-plate or base of our attachment, which is slotted at $c$ to give the required degree of adjustment. This plate has a vertical member C, to which a blade D is rigidly secured in any suitable manner, and to this blade is pivoted a blade E by means of a set-screw $e$, such as scissors or shears are usually provided with. The blade E has preferably a straight upper edge above the pivot $e$, and the portion C of the base-plate extends above the said blade and has pivoted thereto a lever F, the free or outer end of which is slotted or bifurcated, as shown at $f$, to engage with the shank or stem of the set-screw $g$ of the needle-clamp carried by the lower end of the reciprocating bar $a$. Instead of having the slotted end of the lever engage with the set-screw any other suitable means may be employed for connecting these parts, it being evident that as the lever moves in the arc of a circle and the reciprocating bar moves in a direct vertical line a slot or the equivalent should be provided at the point of connection, and it is immaterial whether this slot is open ended or closed.

The lever F is provided with cam-faces $h$ and $i$, which engage with the upper edge of the blade E for imparting an oscillating movement thereto, when the lever is rocked, without the employment of springs or auxiliary devices, it being noted that when the cam-face $h$ of the lever F is brought in contact with the upper edge of the shear-blade rear of its pivot that the front end of the shear-blade will be raised, and the cam $i$ will depress or close the blade when the free end of the lever is depressed. It will also be noted that the cam $i$, which is employed for depressing the blade, is at a considerable distance from the pivot-point of the blade and of the lever, and by so positioning this cam considerable power is exerted on the blade, while less power being required to simply elevate the blade the cam $h$ for imparting this movement is nearer the pivot-point of the lever and of the blade. This simple arrangement of the cams insures the easy running of the machine and obviates unsteadiness in the running, which would be occasioned were the same power employed to elevate the blade when idle that is employed to depress the same when cutting.

The uses of the device are obvious, and it is evident it may be used simply as a cutting attachment for a machine, and does not prevent ordinary sewing being done on the machine at the same time the goods are being cut, shaped, or trimmed.

Having thus described our invention, what we claim as new, and desire to secure by Letters Patent, is—

1. In a trimming or cutting device for sewing-machines, the combination of a fixed or stationary blade carried by a support which is adapted to be secured to the bed-plate of the machine, an oscillating blade pivoted to the stationary blade so as to cut in conjunction therewith, said oscillating blade having portions which project on each side of its pivot, and a lever adapted to be oscillated from the needle-bar, said lever having cam-faces which contact with projecting portions of the oscillating blade on opposite sides of its pivot, substantially as shown, and for the purpose set forth.

2. In combination with a stationary blade and an oscillating blade having projecting portions on each side of its fulcrum, a lever F, having cam-faces on opposite sides and above the pivot-point or fulcrum of the movable blade, said lever having a slotted end for engagement with a vertically-reciprocating part of the machine, substantially as shown, and for the purpose set forth.

3. In a trimming or cutting attachment for sewing-machines, the combination of a plate having means for adjustably attaching the same to the bed-plate of a sewing-machine, said plate B having a vertical portion to which is secured a stationary blade, a movable blade having a portion extending rear of the pivot thereof, and a lever carried by the upwardly-projecting portion of the base-plate above the blade, said lever having cam-faces located at different distances from its pivot and adapted to engage with the upper edge of the movable blade for elevating and depressing the same, substantially as shown, and for the purpose set forth.

4. In a cutting or trimming attachment for sewing-machines, the combination of a stationary blade and an oscillating blade pivoted thereto, of a lever pivoted to a base-plate or carrying-frame above the movable blade and adapted for engagement with a reciprocating part of the sewing-machine, said lever having cam-faces which contact with the oscillating blade on opposite sides of its pivot, said cam-faces being at different distances from the fulcrum of the lever, substantially as shown, and for the purpose set forth.

In testimony whereof we affix our signatures in presence of two witnesses.

ALEXANDER G. FORBES.
GEORGE W. KEMP.

Witnesses:
THEO. G. BESSON,
J. H. VIRGIN.